United States Patent
Wu

(10) Patent No.: US 11,584,420 B2
(45) Date of Patent: Feb. 21, 2023

(54) BACKREST ANGLE ADJUSTING MECHANISM AND INFANT CARRIER HAVING THE SAME

(71) Applicant: CHINA WONDERLAND NURSERYGOODS CO., LTD., Guangdong (CN)

(72) Inventor: Haitao Wu, Guangdong (CN)

(73) Assignee: CHINA WONDERLAND NURSERYGOODS CO., LTD., Guangdong (CN)

(*) Notice: Subject to any disclaimer, the term of this patent is extended or adjusted under 35 U.S.C. 154(b) by 0 days.

(21) Appl. No.: 17/404,110

(22) Filed: Aug. 17, 2021

(65) Prior Publication Data
US 2022/0073119 A1 Mar. 10, 2022

(30) Foreign Application Priority Data
Aug. 18, 2020 (CN) .......................... 202021730989.9

(51) Int. Cl.
*B62B 7/06* (2006.01)
*B62B 7/00* (2006.01)

(52) U.S. Cl.
CPC .................... *B62B 7/006* (2013.01)

(58) Field of Classification Search
CPC ........... B62B 7/006; B62B 7/147; B62B 7/14; B62B 7/142; B62B 7/145
See application file for complete search history.

(56) References Cited

U.S. PATENT DOCUMENTS

| 5,445,433 A * | 8/1995 | Avihod | A61G 5/125 |
| | | | 297/DIG. 6 |
| 6,471,222 B1 * | 10/2002 | Hsia | B62B 9/104 |
| | | | 280/658 |

(Continued)

FOREIGN PATENT DOCUMENTS

| CN | 2730710 Y | 10/2005 |
| CN | 101734273 A | 6/2010 |

(Continued)

OTHER PUBLICATIONS

International Search Report dated Mar. 3, 2020 for International Patent Application No. PCT/CN2019/106188. (English Translation Provided).

*Primary Examiner* — John D Walters
(74) *Attorney, Agent, or Firm* — Volpe Koenig

(57) ABSTRACT

A backrest angle adjusting mechanism and an infant carrier having the same. The backrest angle adjusting mechanism is assembled between a seat body and a backrest of the infant carrier, the seat body being installed on a frame, the backrest being rotatably connected to the seat body, wherein the backrest angle adjusting mechanism comprises a fixing member, an adjustment member, and a connecting member, one end of the connecting member is connected to the backrest, the other end of the connecting member is connected to the fixing member, one end of the adjustment member is connected to the seat body or the frame to form a connecting part, and the other end of the adjustment member is bypassed around the fixing member to form an operating part, operating of the operating part causes the adjustment member to slide on the fixing member to rotate in respect to the seat body.

16 Claims, 4 Drawing Sheets

(56) References Cited

U.S. PATENT DOCUMENTS

| | | | | |
|---|---|---|---|---|
| 7,128,326 | B2* | 10/2006 | Chen | B62B 9/104 |
| | | | | 280/47.38 |
| 8,113,523 | B2* | 2/2012 | Mountz | B62B 9/104 |
| | | | | 280/47.38 |
| 8,201,846 | B2* | 6/2012 | Yu | B62B 7/123 |
| | | | | 280/47.38 |
| 9,102,348 | B2* | 8/2015 | Miller | A47D 1/002 |
| 10,407,090 | B2* | 9/2019 | Driessen | B62B 9/104 |
| 2003/0052474 | A1* | 3/2003 | Yang | B62B 9/104 |
| | | | | 280/47.4 |

FOREIGN PATENT DOCUMENTS

| | | |
|---|---|---|
| CN | 201816623 U | 5/2011 |
| CN | 103112484 A | 5/2013 |
| CN | 106741110 A | 5/2017 |
| CN | 207191144 U | 4/2018 |
| KR | 101677214 B1 | 11/2016 |

* cited by examiner

BACKREST ANGLE ADJUSTING MECHANISM AND INFANT CARRIER HAVING THE SAME

TECHNICAL FIELD

The disclosure relates to an infant carrier, and particularly to a backrest angle adjusting mechanism and an infant carrier having the backrest angle adjusting mechanism.

BACKGROUND

An infant carrier, such as a stroller, a baby seat, a safety seat and the like generally has a seat body and a backrest. At present, there are two common types of infant carriers in the market, and one of them is an infant carrier being relatively simple with a non-adjustable backrest. Such an infant carrier, because its backrest and seat body are fixedly arranged, and the inclination angle of the backrest is not adjustable, cannot meet different usage requirements well, thereby reducing the comfort of use and the adaptability. Another common infant carrier has a backrest with an inclination angle being adjustable in respect with the seat body, but the structure of the adjustment mechanism is relatively complicated, the manufacturing cost is high, and the backrest cannot be effectively adjusted to a vertical position perpendicular to the seat body, thereby making the entire structure of the infant carrier relatively complicated and inconvenient to operate, which affects the use of users.

Therefore, it is urgently needed for a backrest angle adjusting mechanism which is simple in structure, easy to operate, low cost, and can realize backrest adjustment, and it is urgently needed for an infant carrier having such backrest angle adjusting mechanism as well, so as to overcome the above-mentioned problems.

SUMMARY

An object of the disclosure is to provide a backrest angle adjusting mechanism which is simple in structure, easy to operate, low in cost, and capable of adjusting the backrest, so as to ensure the comfort of the baby and infant riding in the infant carrier.

Another object of the disclosure is to provide an infant carrier equipped with a backrest angle adjusting mechanism which is simple in structure, easy to operate, low in cost, and capable of adjusting the backrest, so as to ensure the comfort of the baby and infant riding in the infant carrier.

In order to achieve the above objects, the disclosure provides a backrest angle adjusting mechanism which is suitable for being assembled between a seat body and a backrest of an infant carrier, with the seat body installed on the frame and the backrest rotatably connected to the seat body. The backrest angle adjusting mechanism comprises a fixing member, an adjustment member, and a connecting member, one end of the connecting member is connected to the backrest, the other end of the connecting member is connected to the fixing member, and the connecting member has a certain thickness, one end of the adjustment member is connected to the seat body or the frame to form a connecting part, and the other end of the adjustment member is passed around the fixing member to form an operating part, operating of the operating part causes the adjustment member to slide on the fixing member, and sliding of the adjustment member brings the backrest to rotate in respect to the seat body, thereby adjusting an inclination angle of the backrest.

Preferably, the connecting member is fixed to the backrest, and the fixing member is detachably installed on the connecting member.

Preferably, the connecting member abuts between the backrest and the fixing member, and the fixing member is detachably fixed to the backrest after passing through the connecting member.

Preferably, the connecting member and the fixing member form an integral structure.

Preferably, the connecting member and the fixing member are fixedly connected to each other as a whole, and the connecting member is detachably installed on the backrest.

Preferably, a side of the fixing member opposite to the backrest extends in a direction near the backrest toward the back, thereby forming the connecting member with a certain thickness.

Preferably, connecting member is block-shaped or column-shaped.

Preferably, the connecting member has elasticity. By the arrangement that the connecting member has elasticity, the connecting member has a function of cushioning and shock absorbing, thereby reducing impact force during sitting or adjusting of the backrest angle, and effectively improving the comfort in use.

Preferably, the connecting member is disposed on a relative upper side of a back of the backrest, the fixing member and the connecting member are arranged in a one-to-one correspondence relationship, or one fixing member is fixed to the backrest by at least two connecting members.

Preferably, the adjustment member and the fixing member are arranged in a one-to-one correspondence relationship, or two adjustment members are arranged symmetrically on one fixing member.

Preferably, one connecting member is fixed at a center of the relative upper side of the backrest, one fixing member is fixed to the connecting member, and two adjustment member are symmetrically wound around the fixing member.

Preferably, two connecting members are symmetrically arranged at left and right ends of the relative upper side of the backrest, two fixing members are fixed to two connecting members in a one-to-one correspondence relationship, and each of the fixing members is wound around one adjustment member.

Preferably, the fixing member includes a positioning part and a guiding part connected to each other, the positioning part is used to be fixed to the connecting member, the guiding part is provided with an arc-shaped guide groove, the guide groove is provided with an anti-dropping member and a limiting member therein, the adjustment member is slidably inserted in the guide groove, the anti-dropping member is used to prevent the adjustment member from leaving the guide groove, and the limiting member is used to limit a sliding direction of the adjustment member.

Preferably, the anti-dropping member is located at a relative center of the guide groove and protrudes from an opening of the guide groove, and the anti-dropping member is provided with a through hole communicating with the guide groove.

Preferably, the adjustment member includes a first adjusting section connected between the connecting part and the fixing member and a second adjusting section connected between to the fixing member and the operating part, and when the adjustment member slides on the fixing member, a length of the first adjusting section and a length of the second adjusting section changes in inverse proportion.

Preferably, the backrest angle adjusting mechanism further comprises a locking member, the adjustment member is connected to the locking member after bypassing round the fixing member, the locking member is used to lock the first adjusting section and the second adjusting section at a position after a length adjustment.

Preferably, the locking member and the adjustment member are arranged in a one-to-one correspondence, or at least two adjustment members are fixed to one locking member.

The disclosure further provides an infant carrier comprising a frame, a seat body connected to the frame, a backrest pivoted to the seat body, a backrest angle adjusting mechanism connected between the backrest and the seat body or between the backrest and the frame, and the backrest angle adjusting mechanism is defined as above.

Compared with the related art, the backrest angle adjusting mechanism of the disclosure comprises a connecting member, a fixing member and an adjustment member. The fixing member is fixed to a backrest via the connecting member. One end of the adjustment member is connected to the seat body or frame to form a connecting part, and the other end of the adjustment member bypasses round the fixing member to form an operating part. When the adjustment member is operated to slide on the fixing member, sliding of the adjustment member may bring the backrest to rotate the seat body in respect to the seat body, thereby adjusting an inclination angle of the backrest to meet different usage requirements. Furthermore, since the connecting member has a certain thickness, a spacing between the fixing member and the backrest may be effectively increased, and a spacing between the adjustment member and the backrest is also increased at same time. When the adjustment member is tightened, the backrest may lean more forward, and more upright in respect to the seat body, which also makes the adjustment operation of the adjustment member smoother. The backrest angle adjusting mechanism of the disclosure is simple in structure and convenient in operation, which effectively reduces manufacturing costs, so that the backrest may be smoothly varied between a reliable vertical upright state and a supportable lying state, thereby effectively ensuring the comfort and safety of the baby or infant in an infant carrier having the backrest angle adjusting mechanism.

DETAILED DESCRIPTION

In order to describe the technical content and structural features of the disclosure in detail, the following illustration is provided conjunction with the embodiments and the accompanying drawings.

Figure 1:
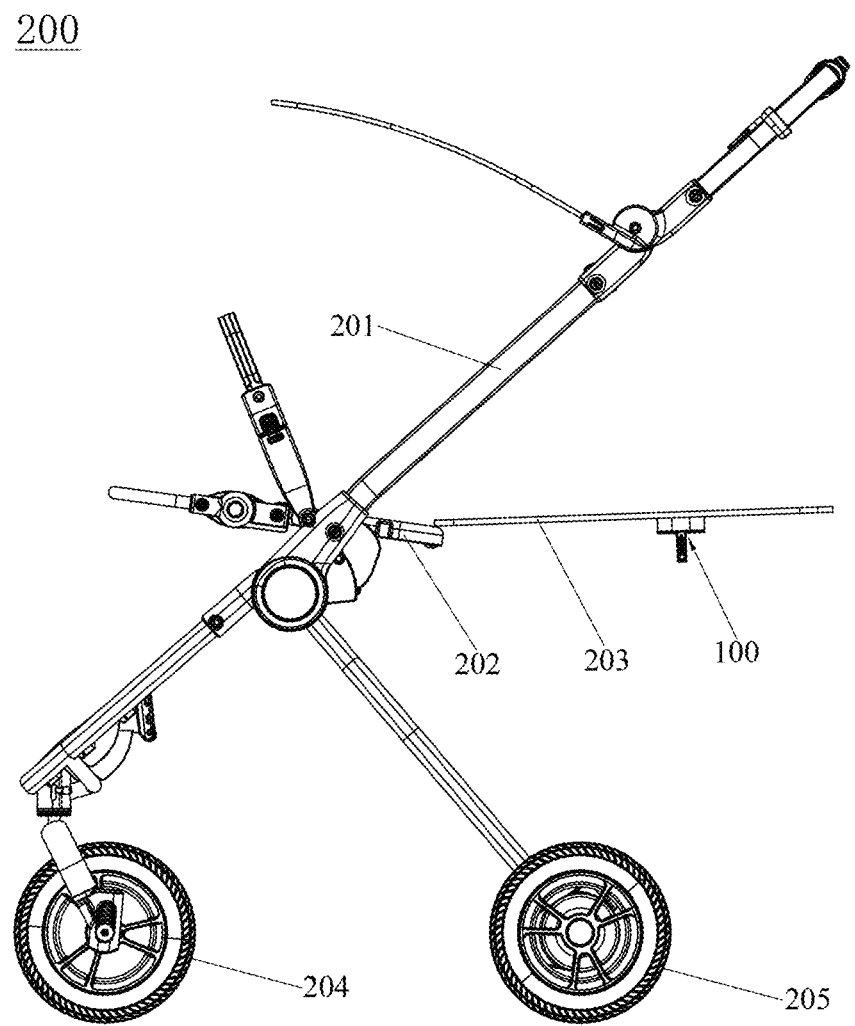
FIG. 1 is a side view of a back angle adjustment mechanism of the disclosure installed on an infant carrier.

Referring to FIG. 1, a backrest angle adjusting mechanism 100 and an infant carrier 200 having the backrest angle adjusting mechanism 100 are provided in this disclosure. The infant carrier 200 comprises, but is not limited to, e.g., a stroller, a carrycot, a bed, a baby basket, a safety seat and the like. Specifically, in the preferred embodiments of the present application, the infant carrier 200 of the disclosure may be a stroller comprising a frame 201, a seat body 202 connected to the frame 201, a backrest 203 pivoted to the seat body 202, and a backrest angle adjusting mechanism 100 connected between the backrest 203 and the seat body 202 or between the backrest 203 and the frame 201. Moreover, a front wheel 204 and rear wheels 205 are disposed on front and rear sides of the frame 201 respectively. The backrest 203 can be rotated by the backrest angle adjusting mechanism 100 in respect to the seat body 202, so as to adjust an inclination angle of the seat body 202 to meet different usage requirements. According to the preferred embodiments of the disclosure, the backrest angle adjusting mechanism 100 may cause the backrest 203 to rotate in a front and rear direction on the seat body 202, such that the backrest 203 may be in a lying state relatively flush with the seat body 202 or in a vertical upright state in respect to the seat body 202, thereby facilitating a baby or infant lying down or sitting in the infant carrier 200. FIG. 1 shows the backrest 203 in the lying state. Of course, the backrest 203 may also be adjusted to an inclined state between the lying state and the vertical upright state.

Figure 2:
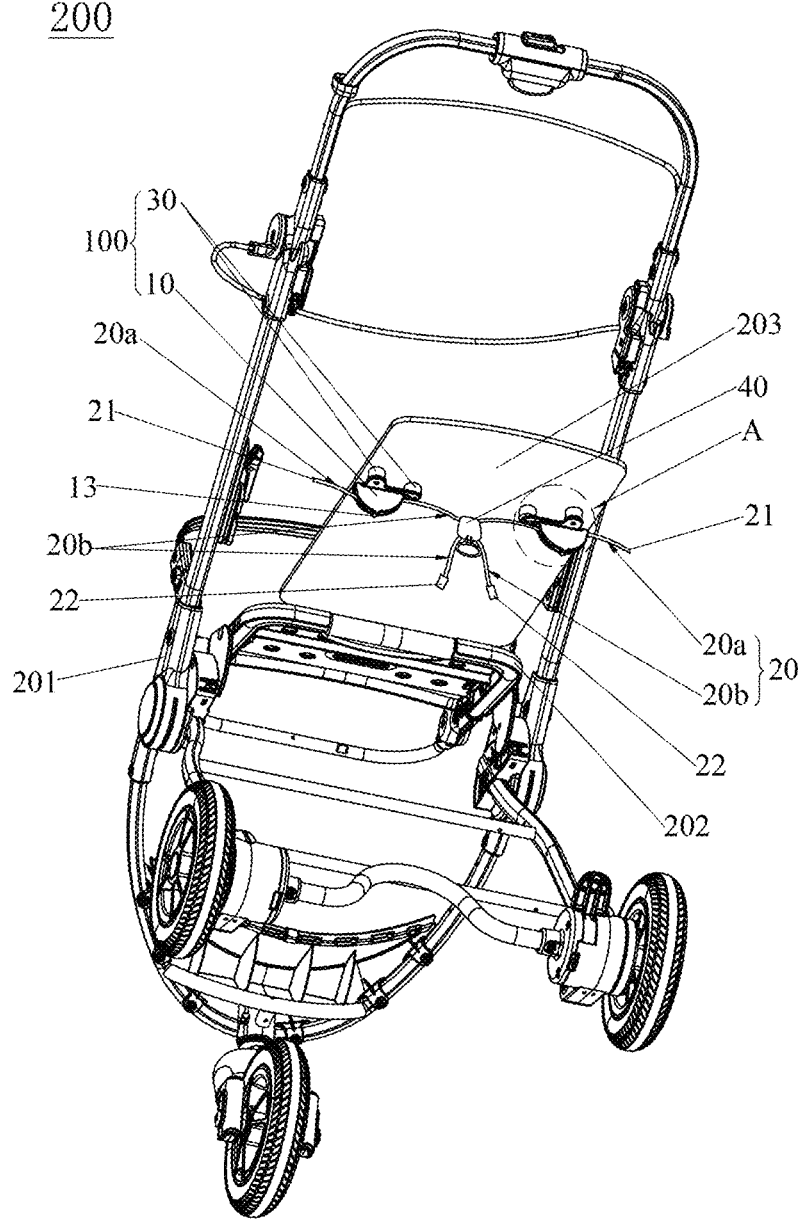
FIG. 2 is a perspective view of a back angle adjustment mechanism of the disclosure installed on an infant carrier.
Figure 3:
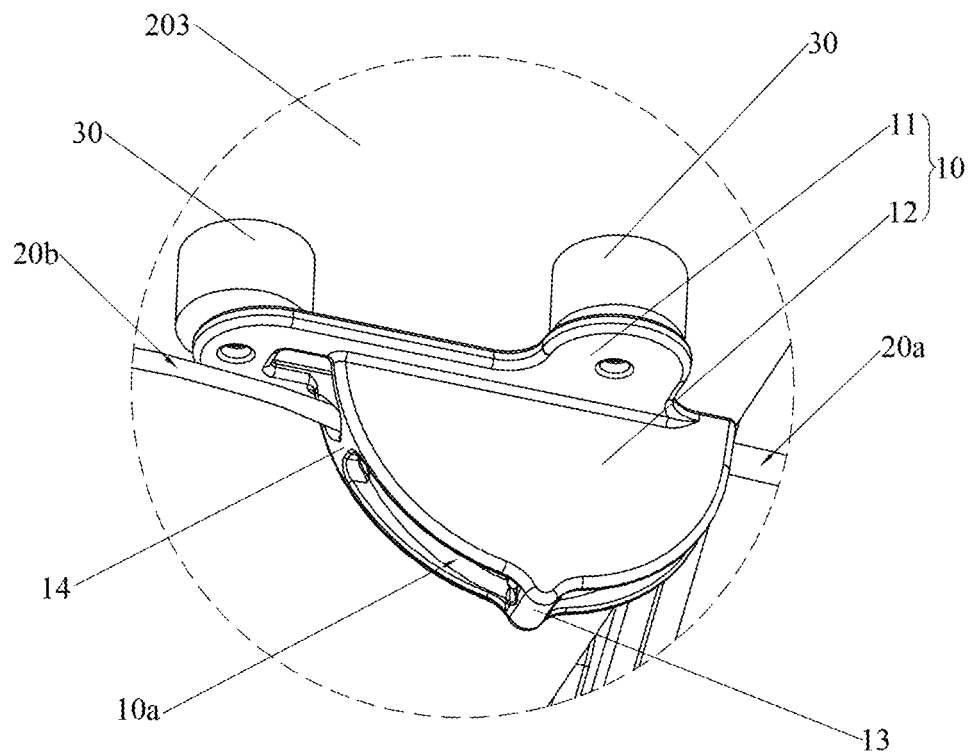
FIG. 3 is an enlarged view of the part A in FIG. 2.

Referring to FIGS. 1 to 3, the backrest angle adjusting mechanism 100 of the disclosure comprises a fixing member 10, an adjustment member 20, and a connecting member 30. One end of the connecting member 30 is connected to the backrest 203, and the other end of the connecting member 30 is connected to the fixing member 10, and the connecting member 30 has a certain thickness. One end of the adjustment member 20 is connected to the seat body 202 or the frame 201 to form a connecting part 21, and the other end of the adjustment member 20 is passed around (bypasses round) the fixing member 10 to form an operating part 22. The adjustment member 20 may be driven by operating of the operating part 22 to slide on the fixing member 10. The backrest 203 may be brought, by sliding of the adjustment member 20, to rotate in respect to the seat body 202, so as to adjust the inclination angle of the backrest 203. Specifically, connecting member 30 has an elasticity so that it has a function of cushioning and shock absorbing, which can reduce an impact force during sitting or during angle adjusting of the backrest 203, and effectively improve the comfort of use. Preferably, the adjustment member 20 may be a rope, belt, or cable, which has a simple structure and is easy to operate, and has a low cost, thereby effectively reducing the production cost.

Referring both FIGS. 2 and 3, the adjustment member 20 comprises a first adjusting section 20a positioned between the connecting part 21 and the fixing member 10 and a second adjusting section 20b positioned between the fixing member 10 and the operating part 22. Since the connecting part 21 of the adjustment member 20 is fixed to the seat body 202 or frame 201, and the overall length of the adjustment member 20 remains certain, when the adjusting member 20 slides on the fixing member 10, the length of the first adjusting section 20a and the length of the second adjusting section 20b are changed in inverse proportion, and the inclination angle of the backrest 203 may be adjusted by changing the length ratio between the two adjusting sections. In details, if the first adjusting section 20a is changed from short to long, the backrest 203 will be adjusted from the vertical upright state toward the lying state, and if the first adjusting section 20a is changed from long to short, then the backrest 202 will be adjusted from the lying state toward the vertical upright state. Furthermore, since the connecting member 30 has a certain thickness, the spacing between the fixing member 10 and the backrest 203 can be effectively increased, and the spacing between the adjustment member 20 and the backrest 203 can be increased as well. When the adjustment member 20 is tightened, the backrest 203 may be adjusted by a greatest extent to a more upright position in respect to the seat body 202. In addition, the arrangement that increases the spacing between the fixing member 10 and the backrest 203 may also make the adjustment operation of the adjustment member 20 smoother.

Referring both FIGS. 2 and 3, in order to place the connecting member 30 between the backrest 203 and the fixing member 10, specifically, in the preferred embodiments of the present application, the connecting member 30 may be fixed to the backrest 203, and the fixing member 10 may be detachably installed on the connecting member 30. Of course, the connecting member 30 may be arranged to abut on between the backrest 203 and the fixing member 10, then the fixing member 10 is detachably fixed to the backrest 203 after passing through the connecting member 30. By either way mentioned above, the fixing member 10 and the backrest 203 may be simply and easily assembled with certain spacing between them. Preferably, in order to simplify structure, the connecting member 30 and the fixing member 10 may also form an integral structure. Specifically, the connecting member 30 and the fixing member 10 may be fixedly connected into one body at first, and then the connecting member 30 may be detachably installed on the backrest 203. Further, the connecting member 30 and the fixing member 10 themselves may be a whole and one face of the fixing member 10 opposite to the backrest 203 may be extended in a direction near the backrest 203, so as to form the connecting member 30 with a certain thickness. At this time, the connecting member 30 is a part of the fixing member 10, and it is sufficient to fix the fixing member 10 on the backrest 203 as a whole.

Figure 4:
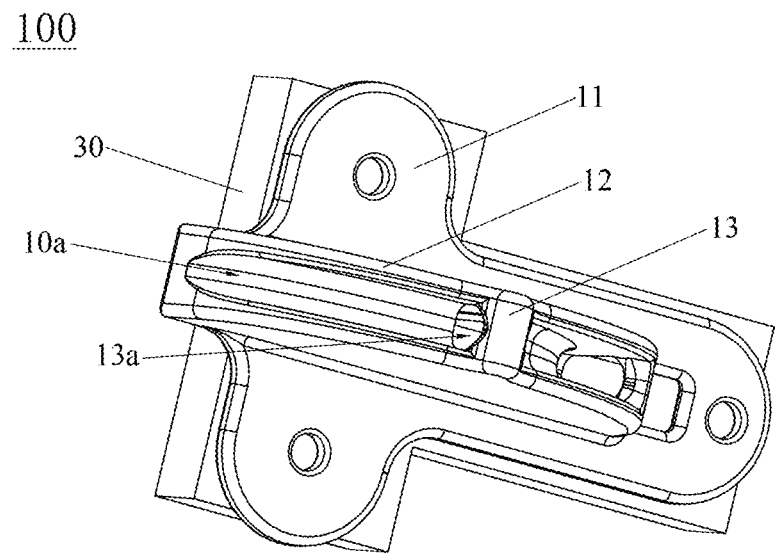
FIG. 4 is a schematic view of a matching structure between a fixing member and a connecting member of a backrest angle adjusting mechanism.
Figure 5:
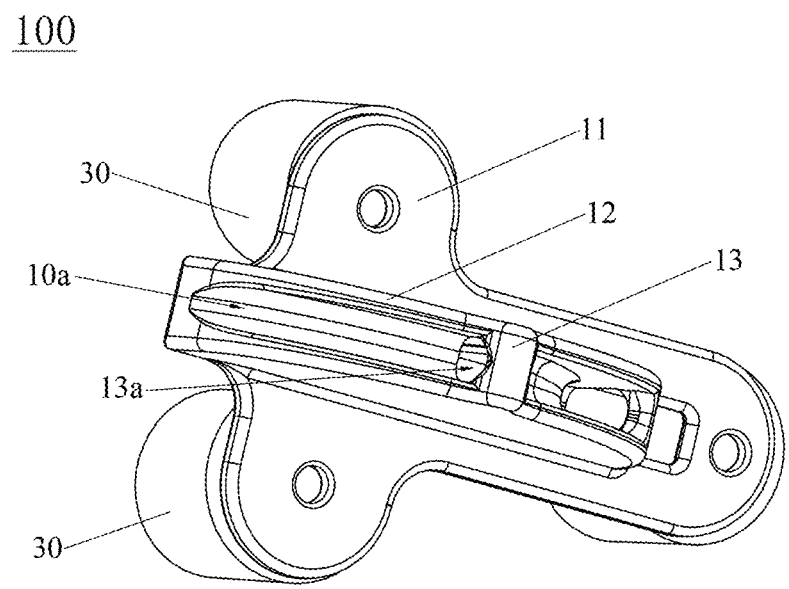
FIG. 5 is a schematic view of the other matching structure between a fixing member and a connecting member of a backrest angle adjusting mechanism.

Referring to FIG. 2, the connecting member 30 is disposed on an opposite upper side of the back of the backrest 203. The fixing member 10 and the connecting member 30 may be arranged in a one-to-one correspondence relationship, or one fixing member 10 may be fixed to the backrest 203 by at least two connecting members 30, both of which can increase the distance between the fixing member 10 and the backrest 203. On this basis, the adjustment member 20 and the fixing member 10 may also be arranged in a one-to-one correspondence relationship, or, two adjusting members 20 are symmetrically arranged on one fixing member 10. Moreover, the connecting member 30 has a profile of block or column. As shown in FIG. 4, the connecting member 30 is in the shape of a plate as a whole, such that an area of a connecting surface between the fixing member 10 and the connecting member 30 is relatively large, and the connecting member 30 and the fixing member 10 are connected more firmly to each other, thereby strengthening the connection between the fixing member 10 and the backrest 203. As shown in FIG. 5, the connecting member 30 is cylindrical, and the fixing member 10 may be fixed to the backrest 203 by a plurality of connecting members 30 arranged separately, so, by multi-point fixing, in one hand, the connection between the fixing member 10 and the backrest 203 may be strengthened, and in the other hand, the adhesiveness between the backrests 203 in different mounting faces may be improved effectively.

Specifically, in the preferred embodiments of the present application, when both the number of the fixing member 10 and the number of the connecting member 30 are one, the connecting member 30 may be fixed at a center of an upper side of the backrest 203, and the fixing member 10 is fixed to the connecting member 30. The number of the adjustment member 20 is one, and its head and tail ends are respectively connected to both sides of the seat body 202 or the frame 201 to form two connecting parts 21. A center end of the adjustment member 20 is passed around the fixing member 10 to form an annular-shaped operating part 22. Then, by pulling the operating part 22 with one hand, adjustment operation of the backrest 203 can be performed, and the structure is simple and the operation is convenient. Of course, if both the number of the fixing member 10 and the number of the connecting member 30 are one, the number of the adjustment member 20 would be set to two, and the two adjustment members 20 may be symmetrically wound on the fixing member 10. Then, the connecting parts 21 of the two adjustment members 20 are symmetrically connected to both sides of the seat body 202 or the frame 201, and the operating parts 22 of the two adjustment members 20 are symmetrically passed around the fixing member 10, so by pulling the two operating parts 22, the adjustment of the backrest 203 may also be performed.

Referring both FIGS. 2 and 3, in the preferred embodiments of the present application, in order to ensure the stability and smoothness of the adjustment of the backrest 203, the number of connecting member 30, the number of the fixing member 10 and the number of the adjustment member 20 are correspondingly set to two. The two connecting members 30 are arranged symmetrically at left and right ends of the relative upper side of the backrest 203. The two fixing members 10 are fixed to the two connecting members 30 in one-to-one correspondence relationship with each of the fixing members 10 being wound by one adjustment member 20, and the connecting parts 21 of the two adjustment members 20 are symmetrically connected to both sides of the seat body 202 or the frame 201, and the operating parts 22 of the two adjustment member 20 are symmetrically passed around the fixing member 10, such that force applied on the backrest 203 may be distributed more even when the backrest 203 is adjusted, and the adjustment of the backrest 203 is more stable and smooth.

It would be noted, if the number of the fixing member 10 is two, the number of the adjusting member 20 may also be one. After a head end of one the adjustment member 20 is connected to one side of the seat body 202 or one side of the frame 201 to form one connecting part 21, a tail end of the adjustment member 20 bypasses round the two fixing members 10 in turn, and then is connected to the opposite side of the seat body 202 or frame 201 to form the other connecting part 21, thereby forming an operating part 22 between the two fixing members 10. Then, by pulling the operating part 22 with one hand, the adjustment operation of the backrest 203 may be realized, so the adjustment of the backrest 203 is stable and convenient. In addition, the number of the fixing member 10 may be more than one, and a plurality of the fixing member 10 are arranged on the backrest 203 in parallel and spaced apart, and the plurality of the adjustment members 20 are wound on the plurality of fixing members 10 in one-to-one correspondence relationship. Moreover, the plurality of the adjustment members 20 are also respectively connected to the seat body 202 or the frame 201. So, by arranging multiple pulling points, force applied on the entire backrest 203 may be distributed more even, such that the adjustment is more stable and smooth, and further improves use comfort and safety of the infant carrier 200.

Referring to FIG. 2, the backrest angle adjusting mechanism 100 of the disclosure further comprises a locking member 40. The adjusting member 20 bypasses round the fixing member 10 and then is inserted and connected to the locking member 40. The locking member 40 is used to lock the first adjusting section 20a and the second adjusting section 20b at a position after a length adjustment. It would be noted, specifically, this embodiment allows more than two adjustment members 20 to pass through one locking member 40, thereby simplifying the structure, realizing synchronous pulling operations, and making adjustments easier. Of course, in other embodiments, the locking member 40 and the adjusting member 20 may also be arranged in a one-to-one correspondence relationship. It would be noted, the structure of the locking member 40 in this embodiment could be implemented by a conventional structure, which can make the adjustment member 20 being unlocked and locked, and will not be described in detail here. Of course, if the locking member 20 is not provided, the disclosure may also perform the adjustment of the backrest 203 by providing a clamp-fitting structure which fitted by clamping with each other on the adjusting member 20 and the fixing member 10. In addition, locking may be further simplified by directly pulling the adjustment member 20 and then knotting/positioning it.

Referring to FIGS. 3 to 5, in order to facilitate inserting and sliding of the adjusting member 20, a guide groove 10a is disposed on the fixing member 10. The adjustment member 20 is inserted in the guide groove 10a and may slide in the guide groove 10a. The guide groove 10a may be arranged in a direction parallel or perpendicular to a longitudinal direction of the backrest 203. Preferably, guide groove 10a is an arc-shaped groove. Specifically, the fixing member 10 has a positioning part 11 and a guiding part 12 which are connected to each other. The positioning part 11 is used to be fixedly connected to the backrest 203 or the connecting member 30, specifically, fixedly connected by thread. The guide groove 10a is disposed on the guiding part 12, and the guiding part 12 and the positioning part 11 are arranged parallel with or perpendicular to each other, such that the guiding groove 10a is arranged in a direction parallel with or perpendicular to the longitudinal direction of the backrest 203. Preferably, the positioning part 11 and the guiding part 12 are an integral structure, so that on the basis of simplifying the structure, the assembly process is optimized, and the manufacturing cost is further reduced.

Referring to FIGS. 3 to 5, the fixing member 10 further comprises an anti-dropping member 13. The anti-dropping member 13 is disposed in the guide groove 10a, in order to prevent the adjustment member 20 slidably inserted in the guide groove 10a from being separated from the guide groove 10a. Specifically, the anti-dropping member 13 is located at a relative center of the guide groove 10a and protrudes from an opening of the guide groove 10a. A through hole 13a communicating with the guide groove 10a is disposed in the anti-dropping member 13. Then the adjustment member 20 may penetrate into the guiding groove 10a from one side of the guiding groove 10a and pass through the through hole 13a and then pass out of the other side of the guiding groove 10a, so as to effectively prevent the adjusting member 20 from leaving the guiding groove 10a during the pulling process. Preferably, the anti-dropping member 13 may be formed by protruding and buckling of both groove walls of the guide groove 10a in a direction away from the opening, and the arrangement that the anti-dropping member 13 and the guide groove 10a being integrated may further simplify the structure.

Referring to FIGS. 3 to 5, the fixing member 10 further comprises a limiting member 14. The limiting member 14 is disposed in the guide groove 10a for limiting a sliding direction of the adjustment member 20 in the guide groove 10a. Moreover, the limiting member 14 may be disposed at an outlet end of the guide groove 10a, so as to limit an angle of the adjustment member 20 when it passes out, so as to make an adjustment. Of course, the limiting member 14 may also be disposed at an inlet end of the guide groove 10a, so as to facilitate the penetration of the adjustment member 20. Specifically, the limiting member 14 is flush with the direction of the opening of the guide groove 10a, and the limiting member 14 and a bottom wall of the guide groove 10a are arranged in parallel and spaced apart, so as to limit sliding of the adjustment member 20 which is inserted between the bottom wall and the limiting member 14, thereby keeping the adjustment member 20 always sliding in the direction of the guide groove 10a. When the operating part 22 of the adjustment member 20 is operated to cause the adjustment member 20 to slide on the fixing member 10, thereby driving the backrest 203 to rotate in respect to the seat body 202. When the backrest 203 rotates to bring the fixing member 10 to rotate so that its limiting member 14 and the connecting part 21 of the adjustment member 20 are relatively flush, since the fixing member 10 and the backrest 203 have a certain distance at this time, the backrest 203 may be adjusted to a position more upright in respect to the seat body 202. It would be noted, in the prior art, the backrest generally can only be adjusted to a position where it is flush with the pivot point of the seat body 202, and often the backrest and the seat body are not completely perpendicular in respect each other. However, in the present application, since the backrest 203 is located on a relative front side of the fixing member 10, and there is a certain distance between the two parts, when the limiting member 14 of the fixing member 10 rotates to be relatively flush with the connecting part 21, the backrest 203 is actually inclined more forward, and the backrest 203 of the present application is more upright respect to the seat body 202.

Compared with the related art, the backrest angle adjusting mechanism 100 of the disclosure comprises a connecting member 30, a fixing member 10 and an adjustment member 20. The fixing member 10 is fixed to a backrest 203 via the connecting member 30. One end of the adjustment member 20 is connected to a seat body 202 or a frame 201 to form a connecting part 21, and the other end of the adjustment member 20 is passed around the fixing member 10 to form an operating part 22. When the adjustment member 20 is operated to slide on the fixing member 10, sliding of the adjustment member 20 may bring the backrest 203 to rotate in respect to the seat body 202, thereby adjusting an inclination angle of the backrest 203 to meet different usage requirements. Furthermore, since the connecting member 30 has a certain thickness, a spacing between the fixing member 10 and the backrest 203 may be effectively increased, and a spacing between the adjustment member 20 and the backrest 203 is also increased at same time. When the adjusting member 20 is tightened, the backrest 203 may be inclined more forward, and thusly more upright in respect to the seat body 202, which also makes the adjustment operation of the adjustment member 20 smoother. The backrest angle adjusting mechanism 100 of the disclosure is simple in structure and convenient in operation, and can effectively reduce manufacturing costs, so that the backrest 203 may be smoothly switched between a reliable vertical upright state and a supportable lying state, thereby effectively ensuring the comfort and safety of the baby or infant in an infant carrier 200 having the backrest angle adjusting mechanism 100.

What disclosed above are only preferred embodiments of the disclosure, and the scope of the disclosure certainly cannot be limited by this. Therefore, any equivalent changes made according to the scope of the disclosure still belong to the disclosure.

What is claimed is:

1. A backrest angle adjusting mechanism suitable for being assembled between a seat body and a backrest of an infant carrier, the seat body being installed on a frame of the infant carrier, the backrest being rotatably connected to the seat body, wherein the backrest angle adjusting mechanism comprises:
a fixing member;
an adjustment member; and
a connecting member,
wherein the connecting member is positioned between the fixing member and the backrest such that one end of the connecting member is connected to the backrest, the other end of the connecting member is connected to the fixing member, and the connecting member has a certain thickness, one end of the adjustment member is connected to the seat body or the frame to form a connecting part, and the other end of the adjustment member is bypassed around the fixing member to form an operating part, and
operation of the operating part causes the adjustment member to slide on the fixing member, and sliding of the adjustment member causes the backrest to rotate in respect to the seat body, so as to adjust an inclination angle of the backrest.

2. The backrest angle adjusting mechanism according to claim 1, wherein the connecting member is fixed to the backrest, and the fixing member is detachably installed on the connecting member.

3. The backrest angle adjusting mechanism according to claim 1, wherein the connecting member abuts between the backrest and the fixing member, and the fixing member is detachably fixed to the backrest after passing through the connecting member.

4. The backrest angle adjusting mechanism according to claim 1, wherein a side of the fixing member opposite to the backrest extends in a direction toward the backrest, thereby forming the connecting member with a certain thickness.

5. The backrest angle adjusting mechanism according to claim 1, wherein the connecting member is disposed on a relative upper side of a back of the backrest, the fixing member and the connecting member are arranged in a one-to-one correspondence relationship, or one fixing member is fixed to the backrest by at least two connecting members.

6. The backrest angle adjusting mechanism according to claim 5, wherein the adjustment member and the fixing member are arranged in a one-to-one correspondence relationship, or two adjustment members are arranged symmetrically on one fixing member.

7. The backrest angle adjusting mechanism according to claim 6, wherein one connecting member is fixed at a center of the relative upper side of the backrest, one fixing member is fixed to the connecting member, and two adjustment members are symmetrically connected around the fixing member.

8. The backrest angle adjusting mechanism according to claim 6, wherein two connecting members are symmetrically arranged at left and right ends of the relative upper side of the backrest, two fixing members are fixed to two connecting members in a one-to-one correspondence relationship, and one adjustment member is connected round each of the fixing member.

9. The backrest angle adjusting mechanism according to claim 1, wherein the fixing member includes a positioning part and a guiding part connected to each other, the positioning part is used to be fixed to the connecting member, the guiding part is provided with an arc-shaped guide groove, the guide groove is provided with an anti-dropping member and a limiting member therein, the adjustment member is inserted in the guide groove and slides therein, the anti-dropping member is used to prevent the adjustment member from leaving the guide groove, and the limiting member is used to limit a sliding direction of the adjustment member.

10. The backrest angle adjusting mechanism according to claim 9, wherein the anti-dropping member is located at a relative center of the guide groove and protrudes from an opening of the guide groove, and the anti-dropping member is provided with a through hole communicating with the guide groove.

11. The backrest angle adjusting mechanism according to claim 1, wherein the adjustment member includes a first adjusting section connected between the connecting part and the fixing member and a second adjusting section connected between the fixing member and the operating part, and when the adjustment member slides on the fixing member, a length of the first adjusting section and a length of the second adjusting section changes in inverse proportion.

12. The backrest angle adjusting mechanism according to claim 11, wherein the backrest angle adjusting mechanism further comprises a locking member, the adjustment member is inserted and connected to the locking member after bypassing round the fixing member, the locking member is used to lock the first adjusting section and the second adjusting section at a position after a length adjustment, the locking member and the adjustment member are arranged in a one-to-one correspondence relationship, or at least two adjustment members are inserted and connected to one locking member.

13. The backrest angle adjusting mechanism according to claim 1, wherein the adjustment member comprises a rope, belt, or cable.

14. The backrest angle adjusting mechanism according to claim 1, wherein the connecting member comprises an elastic material.

15. The backrest angle adjusting mechanism according to claim 1, wherein the connecting member has a profile of a plate, block, or column.

16. An infant carrier comprising:
a frame;
a seat body connected to the frame;
a backrest pivoted to the seat body;
a backrest angle adjusting mechanism according to claim 1, which is connected between the backrest and the seat body or between the backrest and the frame.

* * * * *